US010192435B2

(12) United States Patent
Nguyen et al.

(10) Patent No.: US 10,192,435 B2
(45) Date of Patent: *Jan. 29, 2019

(54) REMOTE CONTROL OF TRAFFIC HEADS (71) Applicant: GE LIGHTING SOLUTIONS, LLC, East Cleveland, OH (US)

(72) Inventors: Truong-Khoa Nguyen, Montreal (CA); Jean-Francois Richard, Montreal (CA); Morne Neser, Montreal (CA); Justin Langlais, Montreal (CA); Shahzil Rana, Montreal (CA)

(73) Assignee: GE LIGHTING SOLUTIONS, LLC, East Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/985,333

(22) Filed: Dec. 30, 2015

(65) Prior Publication Data

US 2016/0247399 A1 Aug. 25, 2016

Related U.S. Application Data (60) Provisional application No. 62/119,785, filed on Feb. 23, 2015.

(51) Int. Cl.
*G08G 1/07* (2006.01)
*G08G 1/095* (2006.01)
(Continued)

(52) U.S. Cl.
CPC ............ *G08G 1/095* (2013.01); *G08G 1/07* (2013.01); *G08G 1/097* (2013.01); *H04L 67/125* (2013.01)

(58) Field of Classification Search
CPC .......... G08G 1/07; G08G 1/095; G08G 1/097; G08G 1/0965; G08G 1/096716;
(Continued)

(56) References Cited

U.S. PATENT DOCUMENTS 5,986,576 A * 11/1999 Armstrong .............. F21V 21/06
116/63 P
5,990,808 A * 11/1999 Baer ...................... G08G 1/087
340/902

(Continued)

FOREIGN PATENT DOCUMENTS

CN 202976491 U 6/2013

OTHER PUBLICATIONS

Lan et al., "Implementation of a wireless Mesh Network Testbed for Traffic Control", Computer Communications and Networks, 2007. ICCCN 2007. Proceedings of 16th International Conference, Honolulu, pp. 1022-1027, Aug. 13-16, 2007.

(Continued)

*Primary Examiner* — Daniel Previl
(74) *Attorney, Agent, or Firm* — Peter Thomas DiMauro; GE Global Patent Operation (57) ABSTRACT Provided is a traffic communication network that includes a signaling system having a plurality of light signaling devices, a controller disposed at at least one traffic intersection, and configured to wirelessly control the plurality of light signaling devices. A remote control system is also provided to wirelessly transmit commands to the controller and directly to the plurality of light signaling devices.

11 Claims, 6 Drawing Sheets

(51) Int. Cl.
  *H04L 29/08* (2006.01)
  *G08G 1/097* (2006.01)
(58) Field of Classification Search
  CPC ....... G08G 1/096725; G08G 1/096741; G08G 1/096758; G08G 1/096783; G08G 1/096791; H04L 67/125; H04W 84/00
  USPC ............ 340/907, 908, 468, 425.5, 471, 531, 340/539.1, 463, 464, 929, 465, 475, 473
  See application file for complete search history.

(56) References Cited

U.S. PATENT DOCUMENTS

| | | | |
|---|---|---|---|
| 6,064,318 A | 5/2000 | Kirchner et al. | |
| 7,211,771 B1 | 5/2007 | Smith et al. | |
| 7,423,551 B1 | 9/2008 | Sharrow | |
| 7,755,510 B2 | 7/2010 | Bilimoria et al. | |
| 8,242,431 B2 | 8/2012 | Dubuc et al. | |
| 8,575,861 B1 * | 11/2013 | Gordin | H05B 33/0854 315/291 |
| 8,598,986 B2 | 12/2013 | Ahmad | |
| 8,716,942 B2 | 5/2014 | Jarrell et al. | |
| 8,819,313 B1 | 8/2014 | Walther et al. | |
| 8,901,846 B2 * | 12/2014 | Routledge | H05B 37/0227 315/291 |
| 2002/0041240 A1 | 4/2002 | Ikeda et al. | |
| 2005/0104745 A1 | 5/2005 | Bachelder et al. | |
| 2006/0092044 A1 * | 5/2006 | Naljotov | G08G 1/096 340/907 |
| 2007/0067410 A1 | 3/2007 | Mulligan | |
| 2008/0074289 A1 * | 3/2008 | Sauder | G08G 1/07 340/909 |
| 2009/0243517 A1 | 10/2009 | Verfuerth et al. | |
| 2010/0026520 A1 | 2/2010 | Witte et al. | |
| 2010/0066484 A1 | 3/2010 | Hanwright et al. | |
| 2010/0171640 A1 | 7/2010 | Delia et al. | |
| 2010/0253545 A1 * | 10/2010 | Han | G08G 1/005 340/944 |
| 2010/0262296 A1 | 10/2010 | Davis et al. | |
| 2011/0001626 A1 * | 1/2011 | Yip | H05B 37/0263 340/635 |
| 2011/0182473 A1 * | 7/2011 | Wang | G08G 1/04 382/103 |
| 2012/0242507 A1 | 9/2012 | Nguyen et al. | |
| 2013/0082849 A1 | 4/2013 | Teffer et al. | |
| 2013/0106619 A1 * | 5/2013 | Williams | G08G 1/07 340/908 |
| 2013/0166109 A1 | 6/2013 | Ginsberg | |
| 2013/0275032 A1 | 10/2013 | Yorke et al. | |
| 2013/0293375 A1 * | 11/2013 | Dreier | G08B 1/08 340/539.1 |
| 2014/0098530 A1 * | 4/2014 | Leshniak | F21S 8/088 362/235 |
| 2014/0139358 A1 | 5/2014 | Lee | |
| 2014/0159924 A1 | 6/2014 | Lee et al. | |
| 2015/0025655 A1 | 1/2015 | Walther et al. | |
| 2015/0189724 A1 * | 7/2015 | Karc | H05B 37/0272 315/149 |
| 2015/0310737 A1 | 10/2015 | Simanowski et al. | |
| 2016/0148507 A1 | 5/2016 | Pittman et al. | |
| 2016/0314688 A1 | 10/2016 | Beckham | |

OTHER PUBLICATIONS

Lan et al., "Experiences in Deploying a Wireless Mesh Network Testbed for Traffic Control", ACM SIGCOMM Computer Communication Review, vol. No. 37, Issue No. 5, pp. 19-28, Oct. 2007.
International Search Report and Written Opinion issued in connection with related Application No. PCT/US2016/019056 dated Jun. 28, 2016.
U.S. Non Final Office Action issued in connection with Related U.S. Appl. No. 14/985,329 dated Jan. 3, 2017.
Final Office Action issued in connection with related U.S. Appl. No. 14/985,341 dated May 15, 2017.
U.S. Final Office Action issued in connection with related U.S. Appl. No. 14/985,329 dated Jun. 22, 2017.

\* cited by examiner

REMOTE CONTROL OF TRAFFIC HEADS

CROSS-REFERENCE TO RELATED APPLICATIONS

The present application claims priority from U.S. Provisional Patent Application No. 62/119,785 which was filed on Feb. 23, 2015, and the content of which is incorporated herein by reference in its entirety.

I. TECHNICAL FIELD

The present invention relates generally to a traffic communication network. In particular, the present invention relates to a traffic communication network capable of controlling lighting signaling devices through remote communication.

II. BACKGROUND

In an existing traffic communication network, traffic lights of a traffic intersection are typically controlled manually by a technician at the traffic light controller located at the traffic intersection.

The traffic controller is connected to the traffic lights at the traffic intersection by a grid system whereby the traffic controller and the traffic lights are coupled together (e.g., hard-wired). The traffic controllers are used to manually synchronize the traffic lights at each traffic intersection. Given a time delay in manual setting of the traffic lights, it can be difficult to successfully synchronize the traffic lights at multiple traffic intersections. Further, it can be difficult to make modifications to the traffic lights, globally or specifically, at multiple traffic intersections, manually and in real-time.

III. SUMMARY OF THE EMBODIMENTS

Given the aforementioned deficiencies, a need exists for a more adaptable and more automated traffic control network.

Embodiments of the present invention provide traffic communication network that includes a signaling system including a controller and a plurality of light signaling devices, and a remote control system, whereby communication between the signaling system and the remote control system is performed wirelessly.

In one exemplary embodiment, a traffic communication network is provided. The traffic communication network includes a signaling system including a plurality of light signaling devices, and a controller disposed at at least one traffic intersection, and configured to wirelessly control the light signaling devices; and a remote control system in wireless communication with the controller, and configured to transmit commands to the controller for controlling the light signaling devices.

In another exemplary embodiment, a traffic communication network is provided. The traffic communication network includes a signaling system that includes a plurality of light signaling devices, a controller disposed at at least one traffic intersection, and configured to wirelessly control the plurality of light signaling devices, and a video camera configured to obtain status information of the plurality of light signaling devices; and a remote control system configured to wirelessly transmit commands to the controller and the video camera, for controlling the plurality of light signaling devices.

In another exemplary embodiment, a traffic communication network is provided. The traffic communication network includes a signaling system that includes a plurality of light signaling devices, a controller disposed at at least one traffic intersection, and configured to wirelessly control the plurality of light signaling devices; and a remote control system configured to wirelessly transmit commands to the controller and directly to the plurality of light signaling devices.

In another exemplary embodiment, a traffic communication network is provided. The traffic communication network includes a signaling system including a plurality of light signaling devices configured to selectively emit light, a controller configured to wirelessly control the plurality of light signaling devices; and a remote control system configured to wirelessly control the controller and the plurality of light signaling devices.

Methods for controlling the plurality of light signaling devices within the above-mentioned traffic communication network are also provided.

The foregoing has broadly outlined some of the aspects and features of various embodiments, which should be construed to be merely illustrative of various potential applications of the disclosure. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

The drawings are only for purposes of illustrating preferred embodiments and are not to be construed as limiting the disclosure. Given the following enabling description of the drawings, the novel aspects of the present disclosure should become evident to a person of ordinary skill in the art. This detailed description uses numerical and letter designations to refer to features in the drawings. Like or similar designations in the drawings and description have been used to refer to like or similar parts of embodiments of the invention.

V. DETAILED DESCRIPTION OF THE EMBODIMENTS

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Embodiments of the present invention provide a traffic communication network that includes a signaling system and a remote control system, for wirelessly and remotely monitoring and configuring a plurality of light signaling devices of the signaling system.

Figure 1:
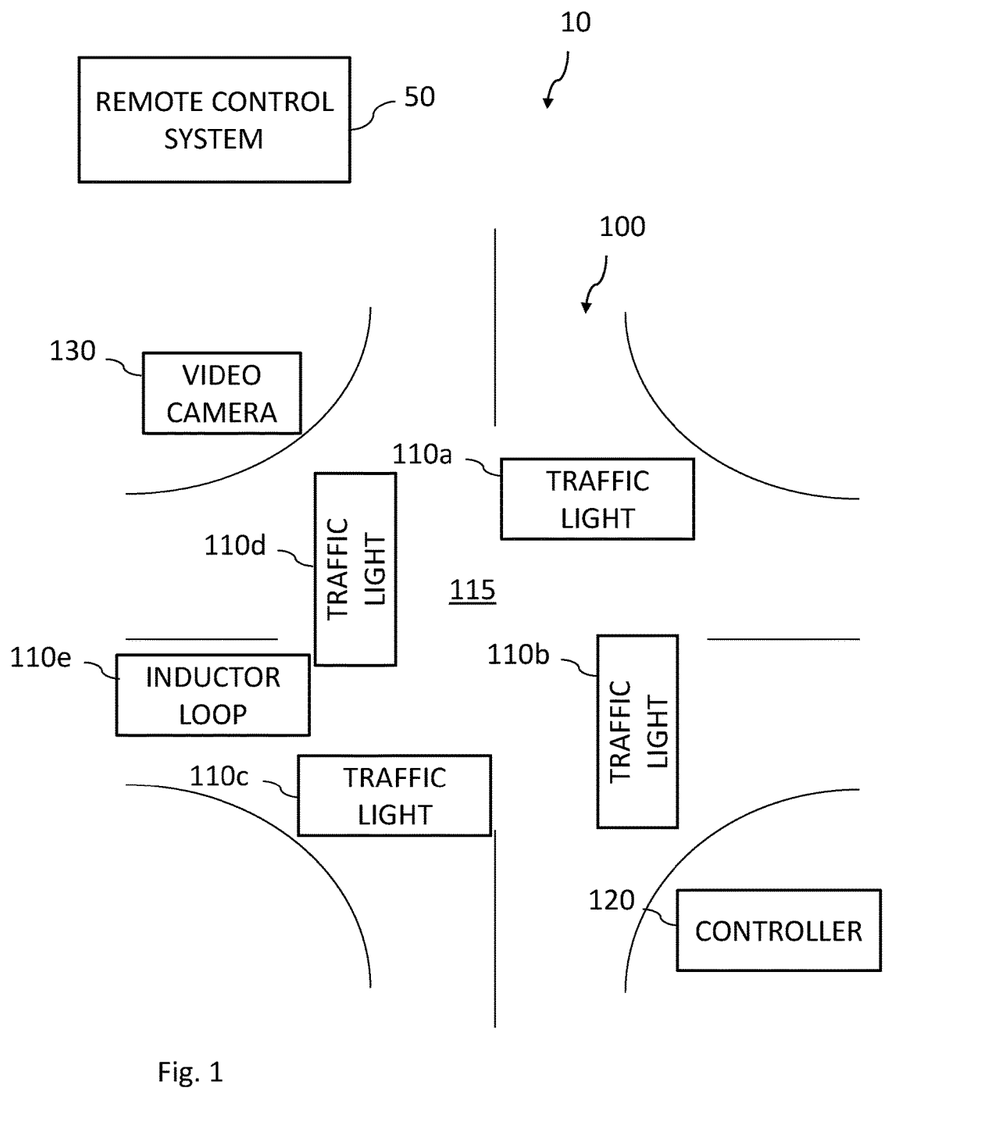
FIG. 1 is a schematic illustrating a traffic communication network that can be implemented within one or more embodiments of the present invention.

Details regarding the traffic communication network of the present invention will now be discussed with reference to FIGS. 1-5. FIG. 1 illustrates the traffic communication network 100 in accordance with one or more embodiments of the present invention.

In FIG. 1, the traffic communication network 10 includes a remote control system 50 and a signaling system 100 comprises at least one traffic intersection 115 comprises a plurality of light signaling devices 110 (e.g., traffic lights 110a, 110b, 110c and 110d and inductor loop 110e) and a controller 120. The remote control system (e.g., a control center) 50 is in wireless communication with the controller 120. The remote control system 50 is capable of configuring the signaling system 100 as necessary.

According the embodiments, the remote control system 50 can configure parameters of the signaling system 100 including, for example, electrical parameters e.g., adjusting the output current or input voltage to the light signaling devices 110, lamp failure conditions, lamp location (e.g., by GPS), intersection phasing, timing functions, synchronization of a clock of the controller 120.

The controller 120 controls the light signaling devices 110 in real-time based on commands received from the remote control system 50. The controller 120 can modify the status of the light signaling devices 110, simultaneously, including for example, synchronizing the light signaling devices 110. The present invention is not limited to any particular commands being transmitted to the controller 120 and/or light signaling devices 110. According to other embodiments, a video camera 130 can also be located at the traffic intersection 115, for monitoring the status of the light signaling devices 110 and transmit the status information to the remote control system 50 for further diagnostics. The remote control system 50 wirelessly transmits commands to the video camera 130, to request status information of the light signaling devices 110. The commands can be transmitted continuously, or periodically during a predetermined time intervals, e.g., every two hours, once daily, etc. Upon receipt of the status information, the remote control system 50 performs diagnostics and wirelessly transmits commands to the controller 120 based on the status information, for wirelessly controlling the light signaling devices 110 based on the status information received. The remote control system 50 also synchronizes the video camera 130 and the controller 120 using at least one of global positioning, network time and computer system time and the controller 120 synchronizes the light signaling devices 110.

Figure 2:
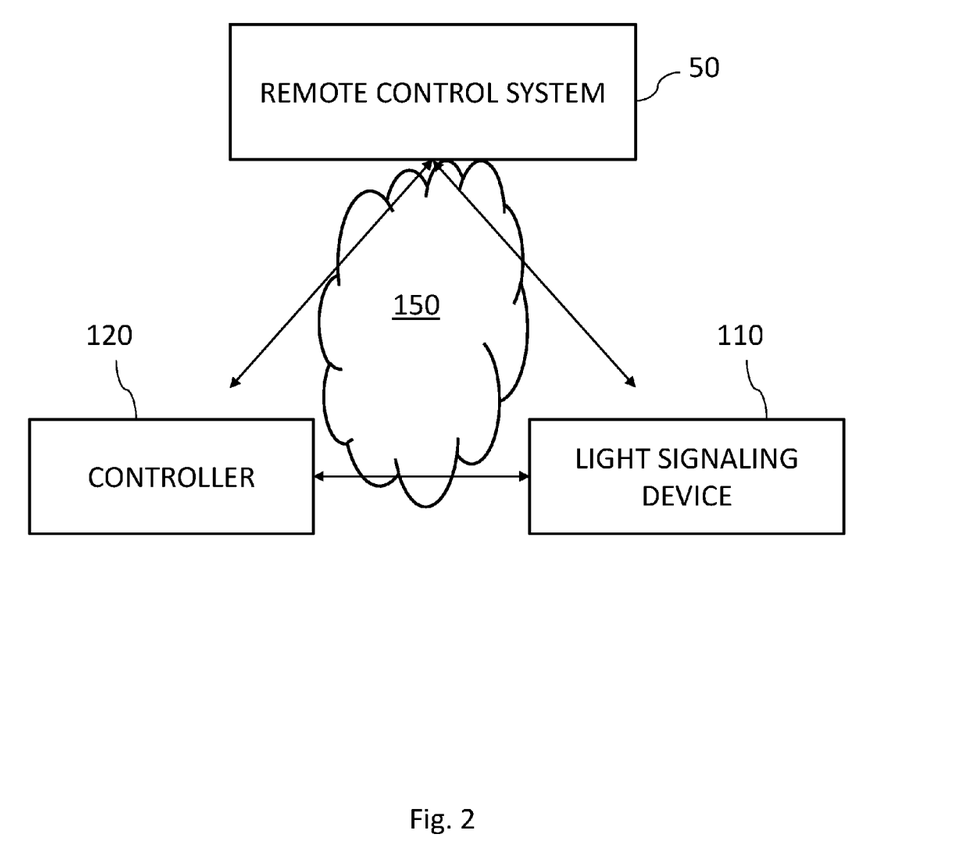
FIG. 2 is a block diagram illustrating various communication operations of the remote control system, the controller, and a light signaling device shown in FIG. 1 that can be implemented within one or more embodiments.

As shown in FIG. 2, communication between the remote control system 50, the video camera 130, the light signaling devices 110 and the controller 120 is performed wirelessly via a wireless communication network 150 that can include Wi-Fi, 61oWPAN, mesh network.

Figure 3:
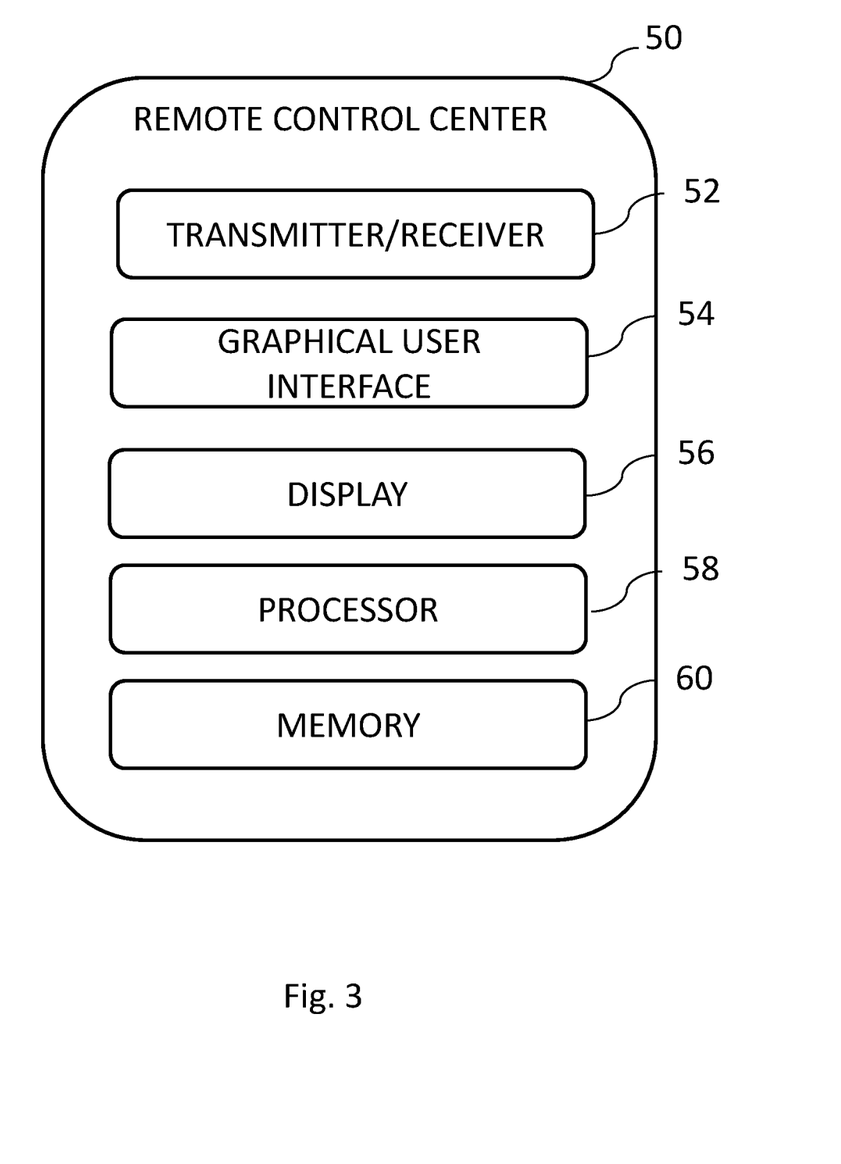
FIG. 3 is a detailed block diagram illustrating the remote control system of FIG. 1 that can be implemented within one or more embodiments of the present invention.

Details of the remote control system 50 are described in reference to FIG. 3. Referring now to FIG. 3, the remote control system 50 includes a transmitter/receiver 52, a graphical user interface (GUI) 54, a display 56, a processor 58, and a memory 60. The remote control system 50 is capable of wirelessly transmitting commands to and receiving signals from the controller 120 (depicted in FIG. 1).

A user is able to input necessary commands to the remote control system 50 via the GUI 54 for monitoring and configuring of the signaling system 100. Real-time parameters of the signaling system 100 are able to be displayed at the display 56 including for example, current status information, historical data, and identification information of the light signaling devices 110 and the controller 120. The identification information can include population, state, installation date, run-time, and warranty expiration, etc. This information can be stored in a centralized inventory in the memory 60.

Figure 5:
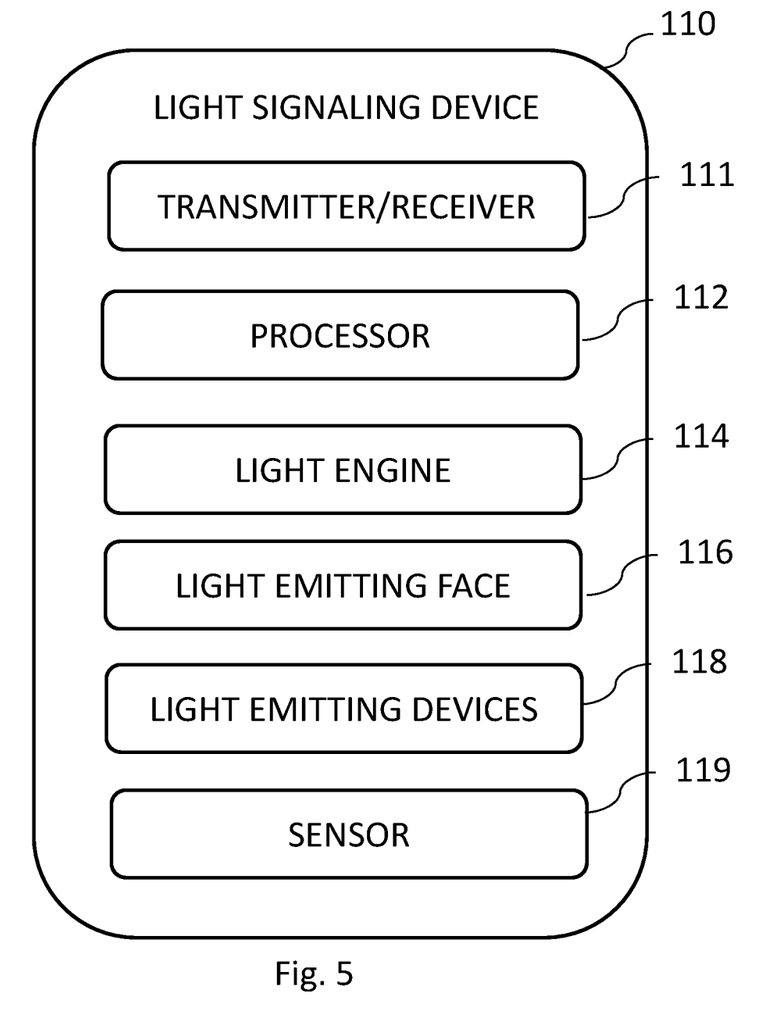
FIG. 5 is a detailed block diagram illustrating a light signaling device of FIG. 1 that can be implemented within one or more embodiments of the present invention.

The remote control system 50 is further configured to perform real-time diagnostics and failure determination of the signaling system 100. The remote control system 50 can perform real-time modifications of the signaling system 100 based on current environmental conditions and historical traffic patterns. The real-time modifications can include activating a heating function via the controller 120 or a light signaling device 110 to defrost the light emitting face 116 (as depicted in FIG. 5), locate and mitigate failures on the signaling system 100 based on GPS signaling of the respective light signaling devices 110.

The real-time modifications can also include the ability to modify operational status of each light signaling device 110 via the controller 120 or directly. By way of example, "flashing red" might indicate stop or a dimming operation, based on the time of day, to enhance driving visibility of drivers. The remote control system 50 is located remotely to the signaling system 100 being monitored.

According to the embodiments, the remote control system 50 can be a web-based or browser based interface accessible via a remote computer system.

Details regarding the controller 120 and the plurality of light signaling devices 120 of the signaling system 100 will now be described with references to FIGS. 4 and 5.

Figure 4:
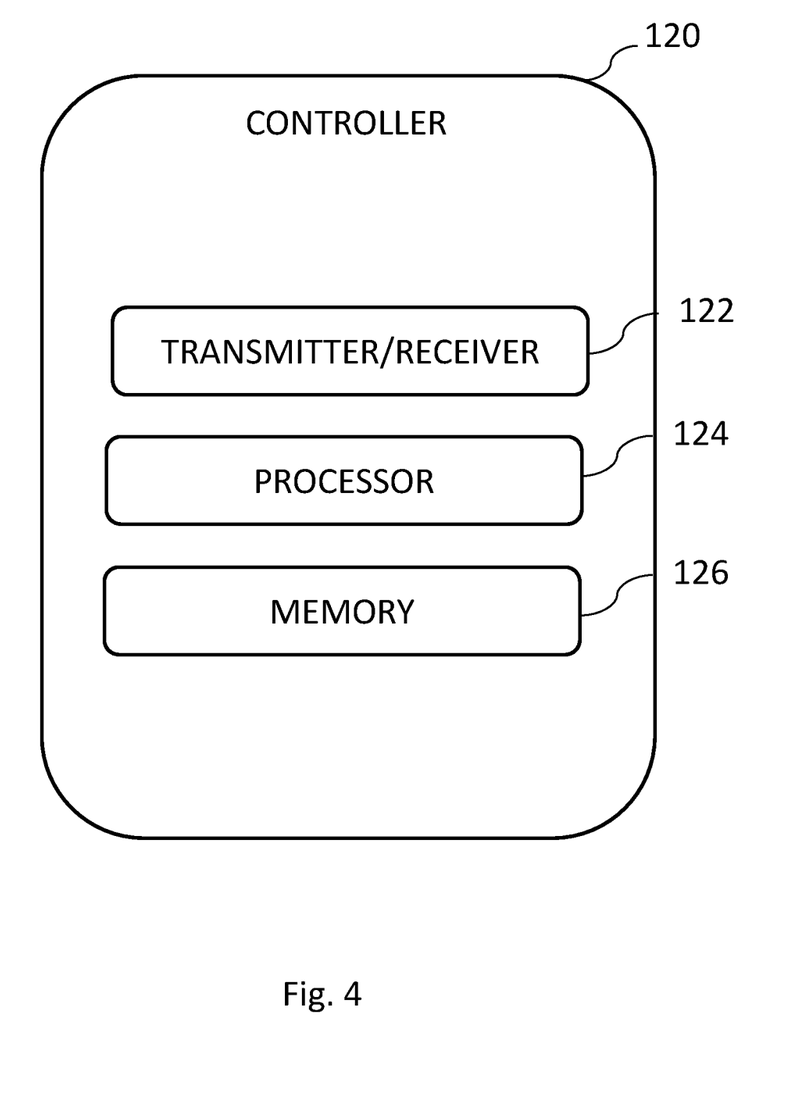
FIG. 4 is a detailed block diagram illustrating the controller of FIG. 1 that can be implemented within one or more embodiments of the present invention.

As shown in FIG. 4, the controller 120 includes a transmitter/receiver 122, a processor 124, and memory 126. The controller 120 is configured to transmit and receive commands from the remote control system 50 to further control the light signaling devices 110 of the signaling system 100. The processor 122 is configured to process the information received from the light signaling devices 110 and the remote control system 50. Instructions received from the remote control system 50 can be stored in the memory 126.

The light signaling devices 110 can include for example, traffic lights, rail lamps, traffic heads and housings, rail signal head and housings, inductor loops or other vehicle detector, obstruction lighting, airport runway lighting. The signaling system 100 can include one or more traffic intersections 115. At the exemplary traffic intersection 115 shown in FIG. 1, the four traffic lights 110a, 110b, 110c and 110d are provided. Each traffic light 110a, 110b, 110c and 110d is configured to transmit and receive signals wirelessly from the controller 120 in communication therewith.

As shown in FIG. 5, each light signaling device 110 includes a wireless node including transmitter/receiver 111, a processor 112, a light engine 114, a light emitting face or display 116 and light emitting devices 118 (e.g., LEDs). Signals for controlling the light signaling device 110 can be received from the controller 110 and the remote control system 50, and processed by the processor 112. The processor 112 drives the light engine to control the light emitting devices 118 on the light emitting face 116 of the light signaling device 110.

Each light signaling device 110 may also include a sensor 119 for independently sensing environment changes and activating dimming operation or defrost operation of the light emitting face 116 in accordance with some embodiments. Thus, each light signaling device 110 is controlled by the controller 120. According to other embodiments, each light signaling device 110 is controlled by the controller 120 and/or directly by the remote control system 50.

In other embodiments, the traffic communication network 10 is capable of being operated on a pay-per-use basis given the real-time usage information collectable by the remote control system 50 via the controller 120 or directly from the light signaling devices 110.

Figure 6:
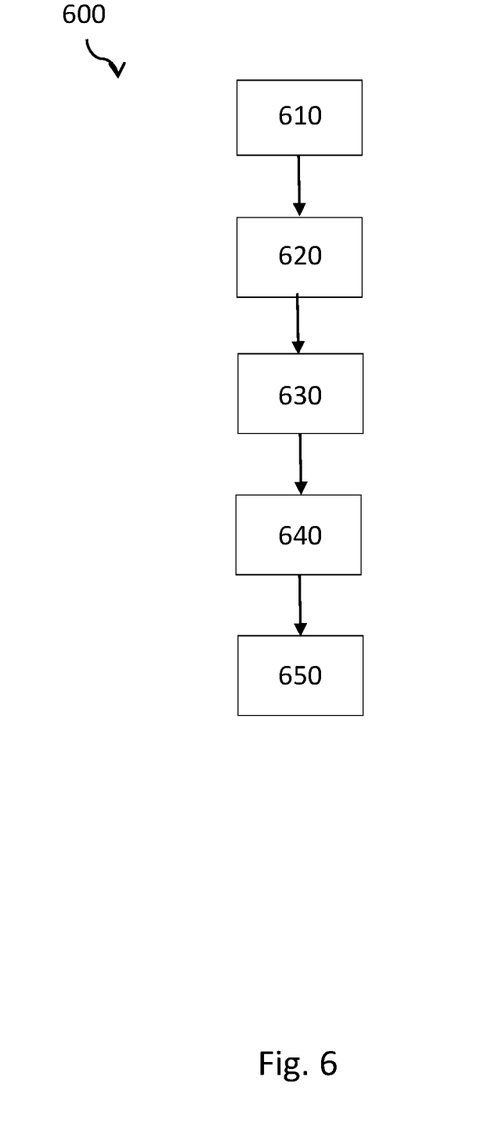
FIG. 6 is a flow chart illustrating a method of controlling the light signaling devices of FIG. 1 that can be implemented within one or more embodiments of the present invention.

FIG. 6 illustrates a method 600 for controlling the light signaling devices 110 of the signaling system 100. The method 600 begins at operation 610 where a remote control system wirelessly communicates with a controller and/or a light signaling device of a signaling system to receive status information of the signaling system. The remote control system can further transmit a signal to a video camera at the traffic intersection for obtaining status information of the signaling system.

From operation 610, the process continues to operation 620 where the controller transmits a signal to the light signaling device requesting status information in real-time and the light signaling device transmits the status information back to the controller or directly to the remote control system. Alternatively, or in addition to, at operation 620, a video camera determines status of the light signaling devices.

From operation 620, the process continues to operation 630 where the status information is sent to the remote control system from the controller, the video camera, and/or directly from the light signaling devices.

From operation 630, the process continues to operation 640 where the remote control system memory performs real-time diagnostics and failure determination, and modifications of the signaling system. The operations performed by the remote control system can be based on current environmental conditions and historical traffic patterns.

From operation 640, the process continues to operation 650 where the remote control system transmits command signals to the controller or the light signaling device directly to activate a heating function of the light signaling device to defrost the light emitting face, mitigate failures on the signaling system based on GPS signaling of the respective light signaling devices 110, modify operational status of each light signaling device 110.

This written description uses examples to disclose the invention including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A traffic communication network comprising:
   a signaling system comprising a plurality of light signaling devices disposed around at least one traffic intersection, each including a wireless node having a processor; and
   a remote control system configured to wirelessly transmit commands to (i) a traffic intersection controller and (ii) the plurality of light signaling devices via the wireless node, the commands being configured for controlling each of the plurality of light signaling devices;
   wherein the plurality of light signaling device are in wireless communication with the remote control system and are configured to transmit status information and provide location information to the remote control system;
   wherein the remote control system is configured to wirelessly receive the status information from the plurality of light signaling devices and controls the plurality of light signaling devices, based on the status information received.

2. The traffic communication network of claim 1, wherein the remote control system is further configured to synchronize the traffic intersection controller and the plurality of light signaling devices using at least one of global positioning, network time and computer system time, and the controller is configured to synchronize the light signaling devices.

3. The traffic communication network of claim 2, wherein the remote control system further comprises a memory configured to store the status information, historical data and identification information for the light signaling devices and the traffic intersection controller of the signaling system.

4. The traffic communication network of claim 1, wherein the status information comprises current environmental conditions and historical traffic patterns regarding the light signaling devices, and the remote control system is configured to perform real-time modifications of the signaling system based on the status information.

5. The traffic communication network of claim 1, wherein the remote control system comprises:
   a transmitter/receiver configured to transmit and receive signals to and from the controller and the light signaling devices;
   a graphical user interface configured to receive input data;
   a display configured to display real-time parameters of the signaling system;
   a processor configured to perform real-time diagnostics and modifications of the light signaling devices.

6. A method for controlling a signaling system, the method comprising:
   wirelessly transmitting, by a remote control system, commands to a plurality of light signaling devices disposed around at least one traffic intersection to receive status information therefrom, each including a wireless node having processor;
   wirelessly obtaining, at the remote control system, the status information from the plurality of light signaling devices;
   wirelessly transmitting location information of the plurality of light signaling devices to the remote control system; and
   wirelessly controlling each of the plurality of light signaling devices via the respective wireless node, based on the status information.

7. The method of claim 6, further comprising:
synchronizing, via the remote control system, a traffic intersection controller and the plurality of light signaling devices.

8. The method of claim 6, wherein the status information comprises current environmental conditions and historical traffic patterns regarding the plurality of light signaling devices, and the remote control system is configured to perform real-time modifications of the signaling system based on the status information.

9. The method of claim 6, further comprising:
storing, at the remote control system, the status information and identification information for the plurality of light signaling devices, and the controller of the signaling system.

10. The method of claim 6, further comprising modifying an operational status of the light signaling devices based on the status information received, wherein modifying the operational status comprises:

adjusting the output current or input voltage of the plurality of light signaling devices; and
modifying intersection phasing of the plurality of light signaling devices.

11. A method for controlling a signaling system including a plurality of light signaling devices via a remote control system in wireless communication with the plurality of light signaling devices in a traffic communication network, the method comprising:
wirelessly transmitting commands from a remote control system to the plurality of light signaling devices to receive status information of the plurality of light signaling devices;
wirelessly obtaining, at the remote control system, the status information from the plurality of light signaling devices; and
modifying intersection phasing based on the status information received.

\* \* \* \* \*